United States Patent [19]

Aldred

[11] Patent Number: 4,753,532
[45] Date of Patent: Jun. 28, 1988

[54] OPTICAL MEASUREMENT APPARATUS

[75] Inventor: Philip J. E. Aldred, Shrewsbury, England

[73] Assignee: Tesa Metrology Limited, Shropshire, England

[21] Appl. No.: 906,805

[22] Filed: Sep. 12, 1986

[30] Foreign Application Priority Data

Sep. 13, 1985 [GB] United Kingdom ............... 8522749

[51] Int. Cl.$^4$ ........................................... G01B 11/02
[52] U.S. Cl. ................................. 356/384; 250/560;
   250/341; 250/349; 250/358.1; 356/385
[58] Field of Search ........................... 356/384–387,
   356/394; 250/341, 349, 358.1, 560

[56] References Cited

U.S. PATENT DOCUMENTS

| | | | |
|---|---|---|---|
| 3,734,620 | 5/1973 | Cade | 250/560 |
| 3,737,237 | 6/1973 | Zurasky | 250/560 |
| 4,061,427 | 12/1977 | Fletcher et al. | 356/384 |
| 4,068,955 | 1/1978 | Bodlaj | 250/560 |

Primary Examiner—Craig E. Church
Assistant Examiner—John C. Freeman
Attorney, Agent, or Firm—Jeffers, Hoffman & Niewyk

[57] ABSTRACT

The disclosure relates to an apparatus for determining the dimensions of an object at linearly spaced locations on the object comprising, a measurement station in which a linear measurement between opposing edges of the object may be made, means to move the object through the measuring station with the dimensions to be measured extending transversely to said path, a light source on one side of the measurement station to direct a beam of light through the measurement station transversely to the path of movement of the object to span the dimension of the object to be measured. Two elongate photo-electric array means one arranged on the opposite side of the object to receive images of the respective edges of the object to produce signals from which the dimension between said edges may be calculated and two lens means are provided to focus images of opposing edges of the object illuminated by the light source on to said two photo-electric array means respectively. Two separate mounting means for the two lens means and array means are provided, each mounting means with the elongate array means extending parallel to each other and means are provided for adjusting the mounting means carrying said array means to cater for different object sizes and means responsive to the images formed on the two photo-electric array means to determine the dimensions between said opposing edges of the object.

20 Claims, 7 Drawing Sheets

OPTICAL MEASUREMENT APPARATUS

BACKGROUND OF THE INVENTION

1. Field of the Invention

This invention relates to optical measurement apparatus and is particularly although not exclusively applicable to measurement of dimensions of shaft-like components such as diameters, ovalities, lengths between shoulders, concentricities, straightness and thread features. Dimensions of non-shaft-like components can also be measured provided they are suitable for optical projection.

2. Background of the prior art

U.K. Patent Specification No. 2,058,344 discloses an electro-optical apparatus for inspecting an elongate workpiece such as a camshaft having spaced lobes which is supported and turned between centres. A sensor head is provided comprising a light source, a lens for forming an image of an edge of a camshaft lobe on a photo-diode array and a read out unit. For components of widely varying dimensions such as valves, several sensors adapted to the particular dimensions to be measured have to be provided. Thus the apparatus is not immediately adaptable to measurement of different components of widely varying sizes.

U.K. Patent Application No. 2,078,945 also discloses an optical measurement system in which photo-detectors are used. The apparatus is particularly concerned with the methods of analysing the light pattern produced on a photo-detector array and no provision is made for rendering the apparatus readily adaptable to suit different components of different dimensions.

SUMMARY OF THE INVENTION

This invention provides optical measurement apparatus for determining a plurality of dimensions of an object at linearly spaced locations on the object comprising, a measurement station in which a linear measurement between opposing edges of the object may be made, means to move the object through the measuring station to present the locations on the object to be measured one by one to the measurement station with the dimensions to be measured extending transversely to said path, a light source on one side of the measurement station to direct a beam of light through the measurement station transversely to the path of movement of the object through the station to span the dimension of the object to be measured, two elongate photo electric array means to receive images of the respective edges of the object in the measuring station to produce signals from which the dimension between said edges may be calculated, two lens means on the opposite side of the measuring station to the light source to focus images of opposing edges of the object to be measured illuminated by the light source in the measuring station on to said two photo-electric array means respectively, two separate mounting means for the two lens means and array means, one mounting means carrying one lens means and associated array means and the other mounting means carrying the other lens means and its associated array means with the elongate array means extending parallel to each other, means for adjusting the mounting means parallel to said array means to cater for different object sizes.

A fixed support structure may be provided having parallel guide means for supporting and constraining the two respective mounting means to move parallel to one another and means are provided for adjusting each mounting with respect to the support structure to permit adjustment of the mounting means with respect to one another.

More specifically the means for adjusting each mounting means with respect to the support structure comprise a lead screw mounted at one end for rotation on the fixed structure extending parallel to said guide means, each mounting means having a screw threaded bore to receive a respective screw whereby rotation of the lead screw adjusts the mounting means with respect to the fixed structure and thereby with respect to the other mounting means.

Alternatively the two support means are engaged by a common drive mechanism for moving the support members in opposing directions. For example the support members have oppositely facing elongate toothed racks extending parallel to the direction of movement of the support means and a drive mechanism has a drive pinion simultaneously engaing both racks to move the racks in opposing directions with rotation of the pinion.

In any of the above arrangements the means to move the object through the measurement station may comprise means to support the object with the object aligned with respect to the measurement station and means to move the support means at a fixed angle to a line extending transversely to the line of measurement at the measurement station whereby, as the object is moved progressively through the measurement station, the image of the object created on the photo-electric detector means moves progressively along the detector means.

More specifically the means for moving the support for the object to be measured comprise a transversing mechanism, means to mount the mechanism on an inclination to the horizontal and means to mount the object support on the traversing mechanism to hold the object in the required alignment with the measuring station and to traverse the object through the measuring station and at the same time along the line of measurement whilst maintaining the required alignment.

For example the mounting means for the traversing mechanism may comprise a first ramp to mount the mechanism at an inclined angle to the horizontal, and the object support has a corresponding inclined ramp on its underside to support the object extending horizontally on the traversing mechanism so that as the object moves horizontally through the measuring station it also moves vertically along the line of measurement.

In any of the above arrangements means may be provided for determining the location of the component at the work station in relation to a predetermined location on the component.

Said position determining means may include a long range transducer responsive to movement of the component support.

Also in any of the above arrangements the means for advancing the component through the measurement station may include a stepper motor, and means may be provided for counting the number of steps moved by the motor for determining the advance of the component through the measurement station.

In a further arrangement the means for moving the component through the measuring station may include a motor driven lead screw having encoder means for counting revolutions of the lead screw to determine the advance of the component.

Means may be provided for turning the workpiece about an axis coincident with the line of measurement to enable a measurement to be taken across a threaded or other convoluted form on the component.

In any of the above arrangements the two lens means have a obliquely extending optical axes and means are provided at the location where the axes coincide to split the beam of light from the object illuminated in the measurement station between the two lens means.

For example the means to split the beam of light between the two lens means may comprise a partially silvered mirror.

Alternatively one lens means may be aligned with the path of the light from the light source to receive light directly therefrom and the other lens means may have its optical axis extending obliquely to that path and the mirror may be is provided at the location where the axis is coincident with the path to reflect light from the light source into the other lens means.

In any of the arrangements set out above reflector means may be provided between the two lens means and two photo-electric array means to provide extended light paths between the lens means and array means to magnify the size of the image of the object as measured at the measuring station and directed on the photo-electric array means.

In the latter case means may be provided for moving the reflector means towards and away from the lens system/photo-electric array means to vary said magnification of the image.

DESCRIPTION OF THE PREFERRED EMBODIMENTS

The following description relates to optical measurement apparatus incorporating a computer programmable to control measurement of dimensions of shaft-like components including diameters, ovalities, lengths between shoulders, concentricities, straightness and thread features. The computer has a visual display unit to display an image of the object as measured and also a printer for printing/plotting the results of the measurements made. Dimensions of non-shaft like components can also be measured provided they are suitable for optical projection.

Major advantages of optical measurement over measurement by contact transducers are:

(A) reduced risk of damage to component surface since measurement is non contact.

(B) ability to measure detail such as fillet radii or narrow grooves.

The gauge described below includes these advantages and also offers:

(A) flexibility, since the positions at which measurements are made are determined by software and not hardware (B) no master components required for calibration of the gauge (C) simplified software for fillets and contours since no probe radius correction is required (D) high speed of measurement compared to contact measurement The basis of operation is that an image of part of the component under measurement, which may be magnified, of equal size or reduced as compared with the actual component, is projected onto one or more light sensitive detectors.

In the following description "light" includes both visible and infra-red radiation. Each light sensitive detector comprises a number of light sensors together with electronic circuits for control of the sensors and to read out the signals from the sensors, all of these parts formed as one integrated circuit connected to the computer of the apparatus. Such devices, in the form of photodiode arrays or ccd arrays are well known and are commercially available.

The component under measurement is traversed through the measurement plane and measurements are taken at a number of positions along the component as each passes through the measurement plane. The readings from the light sensitive detectors are compared to the readings from the detectors when a setting piece of known size is in the measurement plane and hence the diameter (for a shaft-like component) or height (for other components) can be measured. The axial position along the component at which the measurement has been taken is determined either by use of a long-range transducer on the linear traverse stage or by counting the number of position or by use of a shaft encoder mounted on the screw of the leadscrew or ball screw mechanism.

Figure 1:
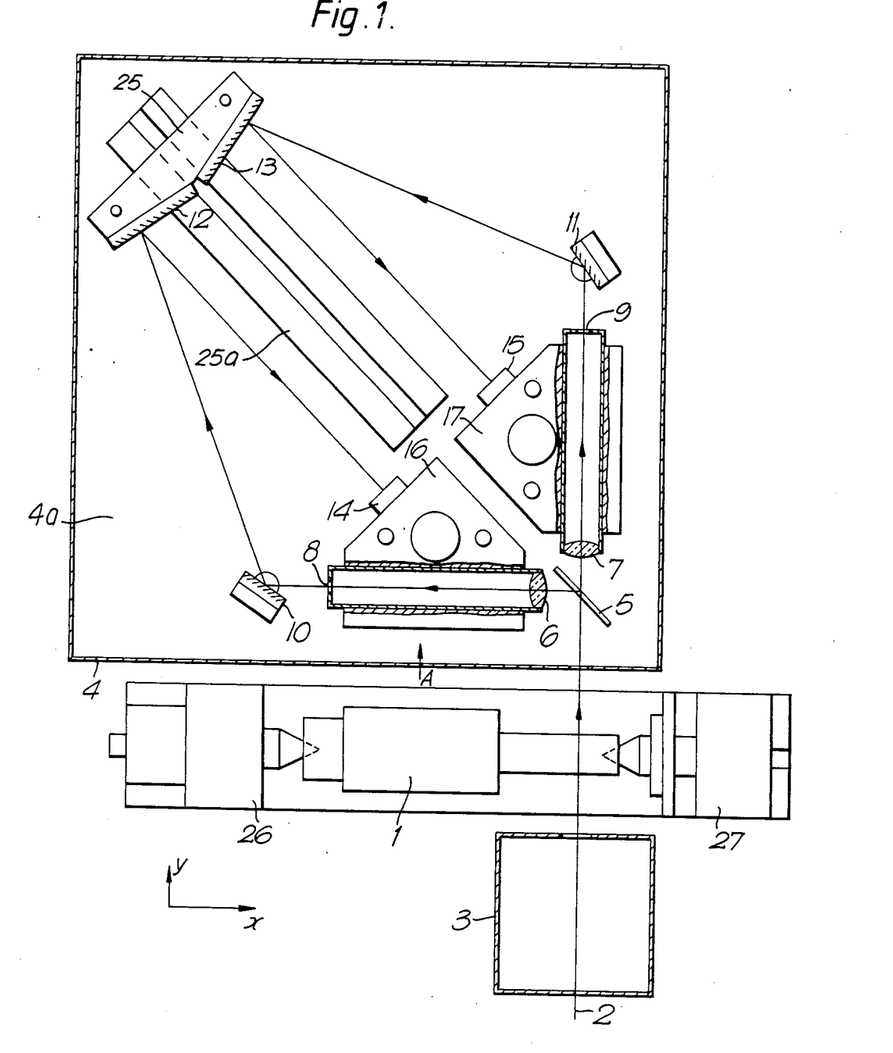
FIG. 1 is a plan view of a measurement apparatus in accordance with the invention.

With reference to the plan view, FIG. 1, the component 1 is mounted in a fixture and is traversed along the "x" axis through a measuring plane 2. The part of the component in and near the measuring plane is illuminated by source 3 comprising a lamp and collimating lens(es). Light which passes the component enters a housing 4 which contains the image forming optics and light sensitive detectors mounted on a base 4a in the housing. A beam splitter 5 reflects half of the light towards lens 6 and transmits the other half towards lens 7. Telecentric stops 8, 9 positioned behind these lenses ensure that only light parallel to, or nearly parallel to, the optical axes of the lenses reaches the light sensitive detectors. This arrangement ensures firstly that the optical magnification is independant of variations in object position along the "y" direction and also that light reflected from the component surface, which would otherwise cause measurement errors, is excluded.

Mirrors 10, 12 and 11, 13 are used to fold the optical paths to two light sensitive detectors 14, 15 which lie in the image planes of lenses 6, 7. This arrangement reduces the overall size of the system for high resolution (hence high magnification and long optical paths) applications but, more importantly, it also allows the arrays and their respective lenses to be mounted on common supports 16, 17.

The measuring envelope of the system (i.e. the range of component diameters that can be measured) is considerably larger than the measuring range for each detector. For example, if each detector has 2000 sensing elements and the system resolution is 2 microns then the measuring range of each detector is 4 mm implying a diameter measuring range of 8 mm. By adjusting the positions of each lens/detector assembly by a mechanism to be described below with reference to FIG. 2, the measuring range becomes any 8 mm within a maximum determined by the height of mirrors 10, 11, 12, 13 and by the size of the field of illumination. Typically a 50 mm range can be used and where necessary this can be extended.

Figure 2:
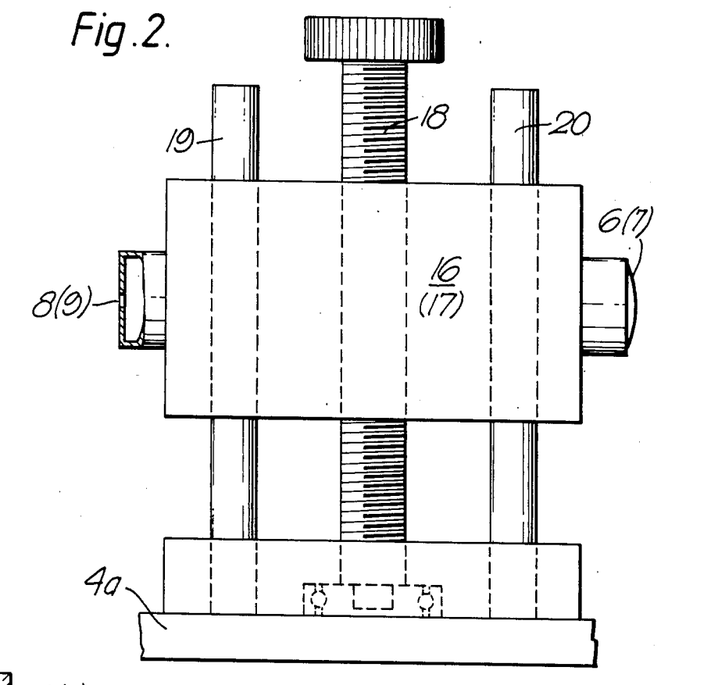
FIG. 2 is a detailed view looking in the direction of arrow A on part of FIG. 1.

Referring now to FIG. 2 each of the supports for a lens/array comprises mounting blocks 16, 17 having a central vertical bore at least apart of which is threaded. A vertical screw 18 with a knob at one end has a matching thread and rotation of this screw causes the mounting block to be raised or lowered. Fixed guide rods 19, 20 prevent lateral movement of the block 16 (17). Following adjustment the apparatus is re-calibrated as described previously.

Adjustment of the lens and detector simultaneously as described above ensures that the detector is always on the optical axis of the lens and that the aperture of the lens is kept small, both of which lead to higher accuracy than the alternative arrangement in which a large aperture lens is used and only the detectors are moved. Furthermore, the close proximity of lens and sensor reduces the effects of any thermally induced distortions in the system.

Figure 3:
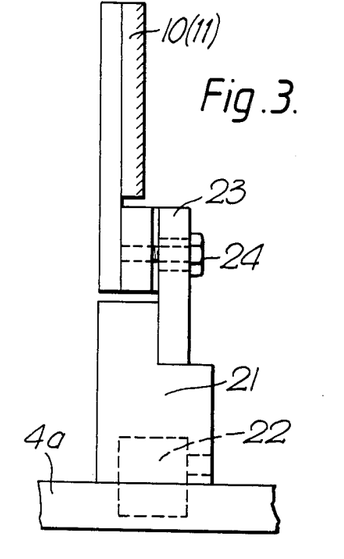
FIGS. 3 and 3A contain a detailed view of a further part of the apparatus of FIG. 1.
Figure 3A:
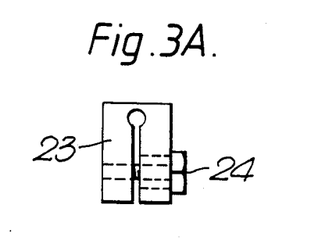

Mirrors 10, 11 are each mounted via a support 21 (FIG. 3) which rotates about a peg 22 for coarse angular adjustment of the mirror. Fine adjustment is achieved through a flexure pivot 23 and clamping screw 24 incorporated in 21. These fine adjustments are used to ensure that the two detectors view the component at identical axial locations along the component. This is particularly necessary for measuring diameter of narrow grooves or other such features on the component.

Figure 4:
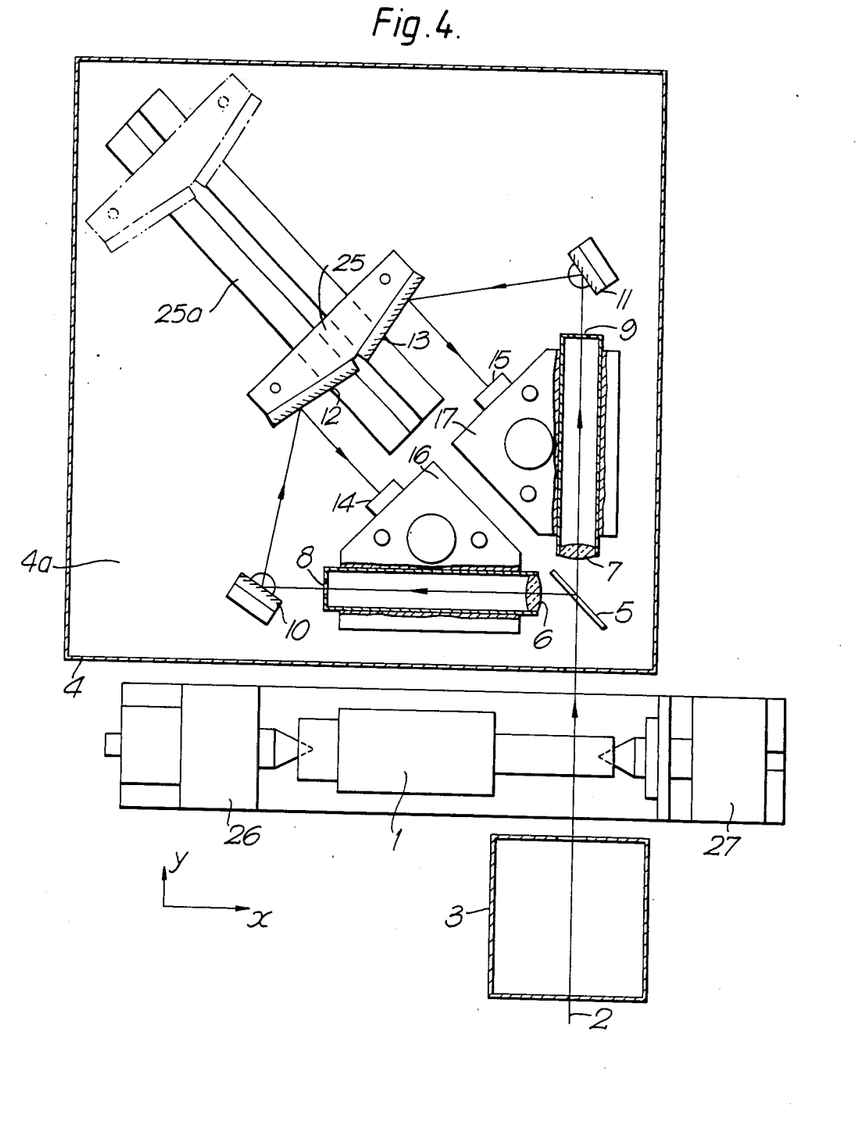
FIG. 4 is a similar view to that of FIG. 1 showing the apparatus in a different position of adjustment.

Mirrors 12, 13 share a common mount 25 which can be moved along a guide way 25a and secured in position to base 4a as shown in FIG. 4 to increase the resolution and hence the measuring range by reducing the optical magnification. Lenses 6, 7 are also adjusted for correct focus at the new magnification.

The axial position of the component is altered by a motor/leadscrew or motor/ballscrew or other linear traverse arrangement and this axial position is monitored either by using a stepper motor and counting the number of steps or by a shaft encoder on the screw or, for maximum precision, by using a long-range linear transducer.

Figures 5, 6:
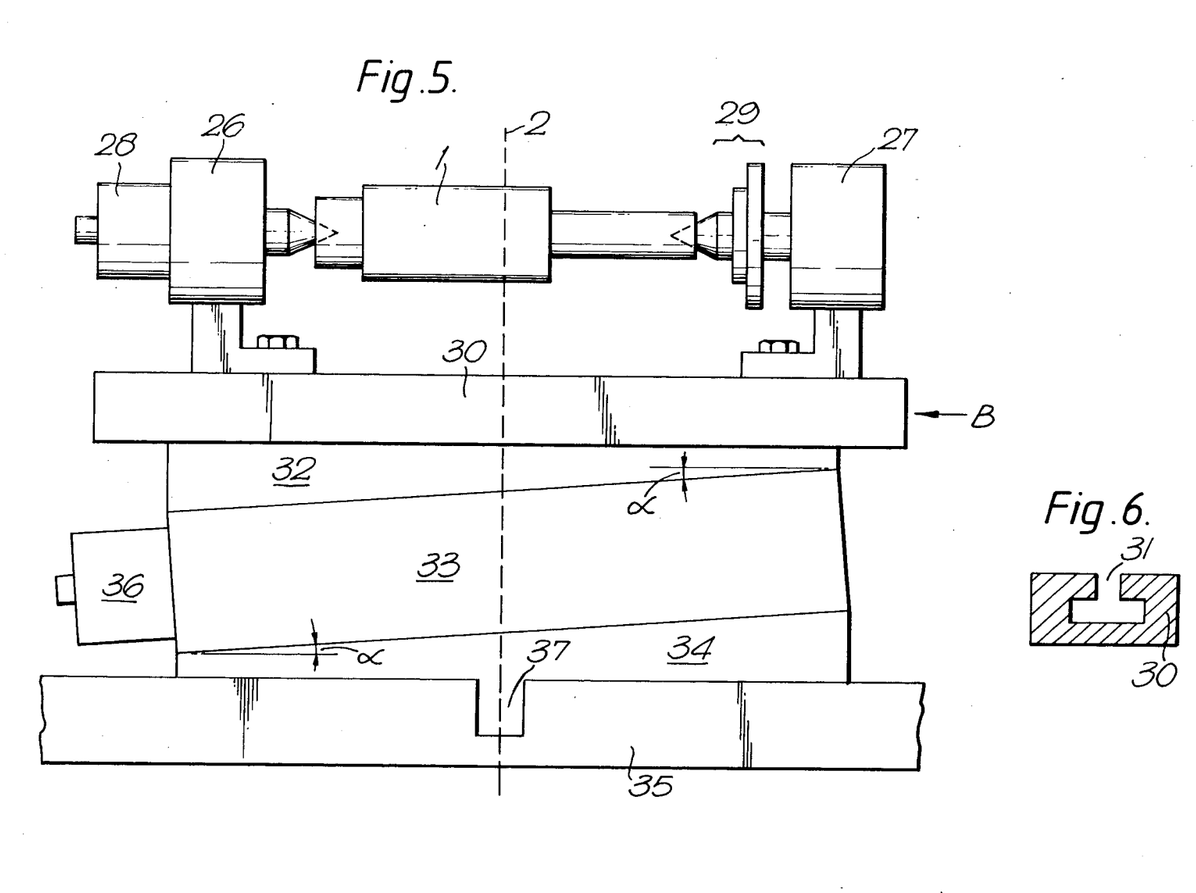
FIG. 5 is a front elevation view of the apparatus shown in FIG. 1.
FIG. 6 is a detailed view of part of the apparatus shown in FIG. 5 looking in the direction of arrow B.

An elevation of the component mounting fixture is shown in FIG. 5. The component 1 is mounted between centres 26, 27 one of which, 26 can be driven by a motor 28, preferably a stepper motor, to rotate the component for some measurements (e.g. ovality). The other centre, 27 is spring loaded (details not shown) to hold the component firmly and also incorporates a calibrated setting piece 29 in the form of a stepped cone which is used to calibrate the gauge and can also be used to check the calibration during each measurement cycle. Both centres can be adjusted in position along a track 30 to suit the length of the component and are clamped using a T-slot 31 in the track 30. Alternative methods for holding the component, such as vee supports can also be used.

The track 30 is connected to the gauge base 35 via two wedges 32, 34 and a linear traverse unit 33. The linear traverse is typically a ball screw or leadscrew driven by a stepper motor 36.

The purpose of the wedges 32, 34 is to raise the component as it travels through the measurement plane 2 while maintaining the component axis in the horizontal plane. The wedges may be simple wedges as shown in FIG. 5 or adjustable using a pivot and spacers or a sine table arrangement.

With these wedges, and assuming an ideal response from the light detector, the resolution of the system is improved by a factor "N" if "N" readings over an axial distance along the component of "x" are averaged where $$x = \frac{nr}{\tan\alpha}$$

in which "r" is the nominal resolution of the system (i.e. the detector array resolution divided by the optical magnification), "n" is an integer and "α" is the angle of the wedges 32, 34.

This improvement is more effective than the improvement gained by simple averaging of multiple readings since it is proportional to N whereas the latter is proportional to $\sqrt{N}$. The latter method also assumes that some source of random variations of magnitude at least comparable to "r" is also present and this is not necessarily valid.

For typical values of
r=5 micron
x=0.5 mm
n=1
We have
α=0.01 rad

There is a loss of useful measuring range due to the movement of the component in the vertical plane as it is traversed horizontally. This loss is Xtan where X is the total horizontal traverse. Thus with this system we have $$\text{resolution} = \frac{r}{N}$$

$$\text{range} = r\,Ns - X\tan\alpha$$
$$= r\,Ns - \frac{X}{X}$$

where
Ns=number of sensors in the detector
n=1

Thus for typical values of Ns=2000 X=200 mm. x=0.5 mm N=10 there is a ten fold improvement in resolution gained for a 20% loss of measuring range. This is equivalent to an 8 fold improvement in resolution for a given measuring range.

A value of N=10 is the useful practical maximum with currently available arrays since variations from the ideal in array output (e.g. differences in sensitivity between diodes, noise) will limit any further improvement.

The final element of the fixture is a pivot 37 in the measuring plane about which the fixture may be rotated to align the component correctly for measurement of thread features.

Figure 7:
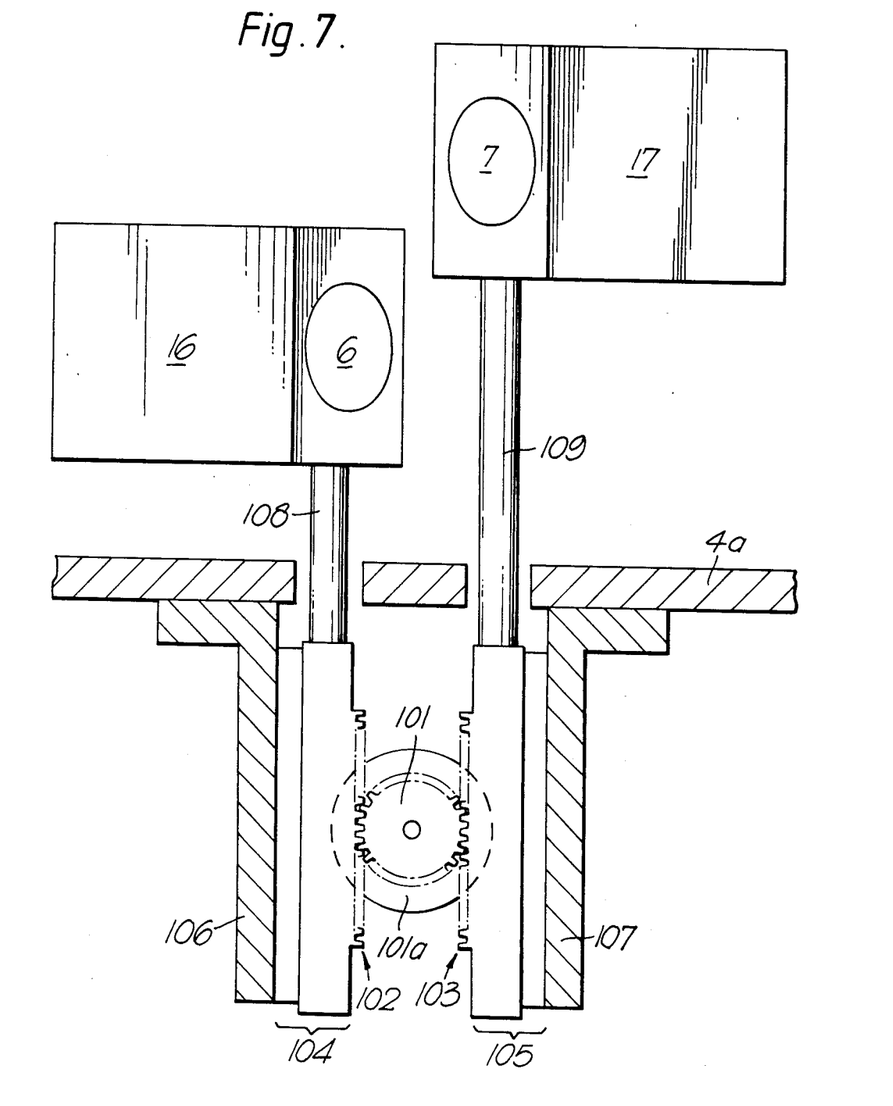
FIGS. 7 to 9 show further modifications to the apparatus.

Further developement of the optical measurement system has resulted in the following improvements;

An alternative method for adjusting the vertical separation between the two lens mounting blocks 16, 17 as shown in FIG. 7 and comprising a pinion 101 driven by a motor indicated at 10a and engaging two racks 102, 103. The racks are mounted on vertical linear slides 104, 105 which are themselves supported via brackets 106, 107, to the underside of the baseplate 4a which supports the other elements of the optical system. The lens mounting blocks 16, 17 are mounted above the racks via pillars 108 109. Rotation of the motor connected to the pinion causes one rack to rise and one to fall thus increasing or decreasing the vertical separation between the lens mounting blocks 16, 17. The motor is conveniently a stepper motor which has good holding torque at standstill and which can be interfaced using standard electronic drives to the gauge control computer.

Figure 8:
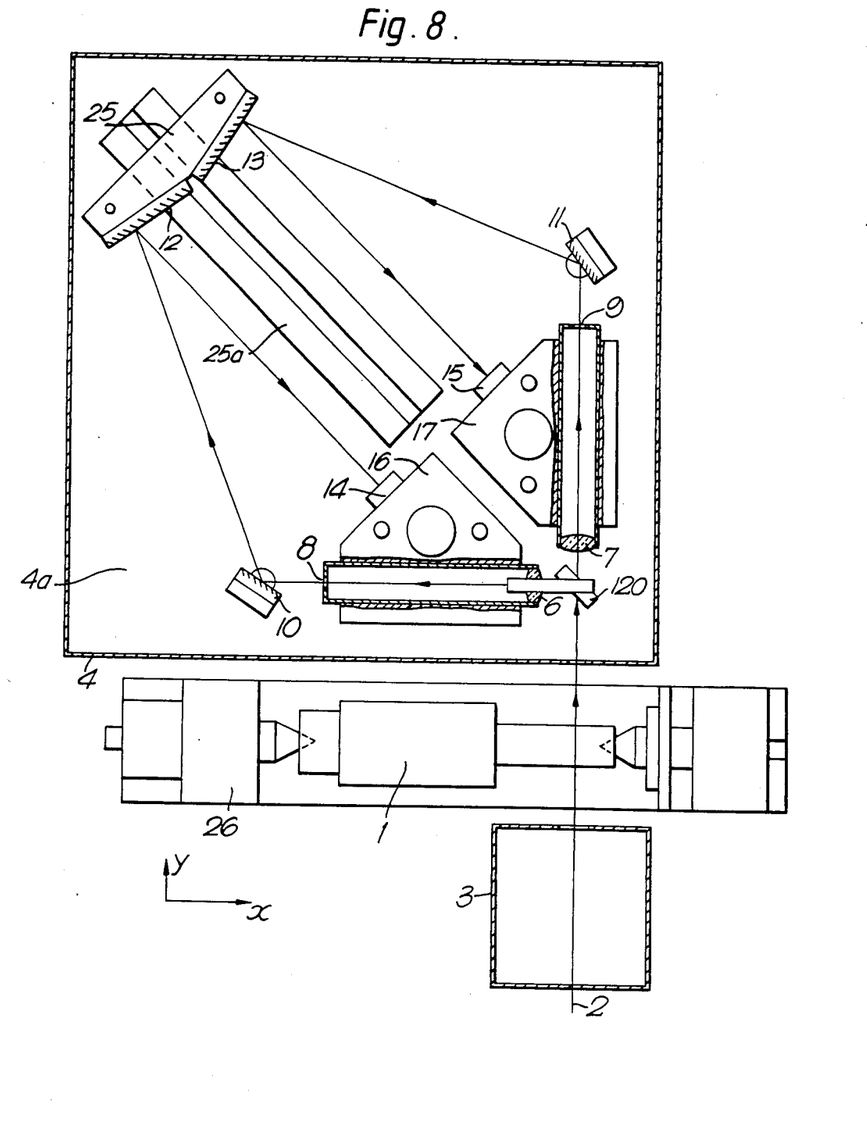
Figure 9:
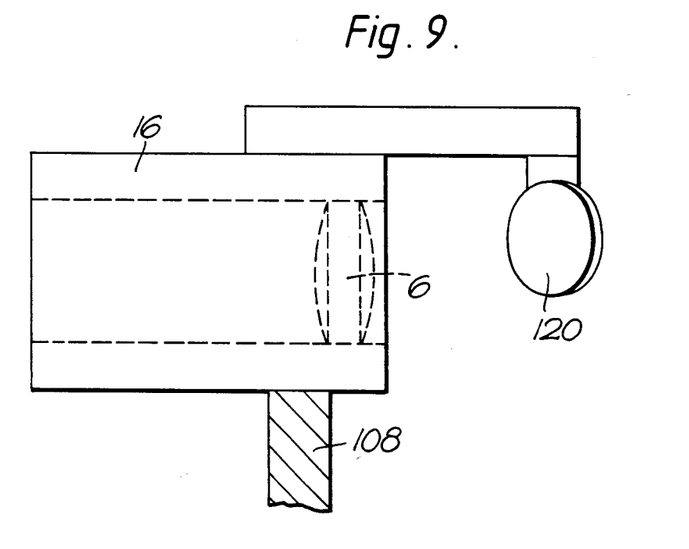

The beam splitter can be replaced by a small mirror 120 mounted on an adjustable bracket attached to the lens mounting block 16 (see FIGS. 8,9). This doubles the light intensity on the light sensitive arrays 14, 15 and therefore increases the speed of measurement since the arrays may be scanned electronically more quickly.

I claim:

1. Optical measurement apparatus for determining a plurality of dimensions of an object at linearly spaced locations on the object comprising, a measurement station in which a linear measurement between opposing edges of the object may be made means to move the object through the measurement station along a part to present the locations on the object to be measured one by one to the measurement station with the dimensions to be measured extending transversely to said path, a light source on one side of the measurement station to direct a beam of light through the measurement station transversely to the path of movement of the object through the station to span the dimension of the object to be measured, two elongate photo electric array means to receive images of the respective opposing edges of the object in the measurement station to produce signals from which the dimension between said edges may be calculated, two lens means on the opposite side of the measuring station to the light source to focus images of opposing edges of the object to be measured, illuminated by the light source in the measuring station on to said two photo-electric array means respectively, two separate mounting means for the two lens means and array means, one mounting means carrying one lens means and associated array means and the other mounting means carrying the other lens means and its associated array means with the elongate array means extending parallel to each other, means for adjusting the mounting means parallel to said array means to cater for different object sizes and means responsive to the images formed on the two photo-electric array means to determine the dimension between said opposing edges of the object.

2. Optical measurement apparatus as claimed in claim 1, wherein a fixed support structure is provided having parallel guide means for supporting and constraining the two respective mounting means to move parallel to one another and means are provided for adjusting each mounting with respect to the support structure to permit adjustment of the mounting means with respect to one another.

3. Optical measurement apparatus as claimed in claim 2 wherein the means for adjusting each mounting means with respect to the support structure comprise a lead screw mounted at one end for rotation on the fixed structure extending parallel to said guide means, each mounting means having a screw threaded bore to receive a respective screw so that rotation of the lead screw adjusts the mounting means with respect to the fixed structure and with respect to the other mounting means.

4. Optical measurement apparatus as claimed in claim 2 wherein the two support means are engaged by a common drive mechanism for moving the support members in opposing directions.

5. Optical measurement apparatus as claimed in claim 4 wherein the support members have oppositely facing elongate toothed racks extending parallel to the direction of movement of the support means and a drive mechanism has a drive pinion simultaneously engaging both racks to move the racks in opposing directions with rotation of the pinion.

6. Optical measurement apparatus claimed in claim 1 wherein the means to move the object through the measurement station comprises means to support the object with a line of measurement along the object aligned with respect to the measurement station and means to move the support means along a path of movement, with said line of measurement along the object being at a fixed angle with respect to said path of movement so that, as the object is moved progressively through the measurement station, the image of the object created on the photo-electric array means moves progressively along the array means.

7. Optical measurement apparatus as claimed in claim 6 wherein the means for moving the support for the object to be measured comprise a traversing mechanism, means to mount the transversing mechanism on an inclination to a horizontal and direction and means to mount the object support on the traversing mechanism to hold the object in the required alignment with the measuring station and to traverse the object through the measuring station and at the same time along the line of measurement while maintaining the required alignment.

8. Optical measurement apparatus as claimed in claim 7 wherein the mounting means for the traversing mechanism comprise a first ramp to mount the traversing mechanism at an inclined angle to the horizontal direction, and the object support has a corresponding inclined ramp on its underside to support the object extending horizontally on the traversing mechanism so that as the object moves horizontally through the measuring station it also moves vertically along the line of measurement.

9. Optical measurement apparatus as claimed in claim 1 wherein means are provided for determining the location of the object at the work station in relation to a predetermined location on the object.

10. Optical measurement apparatus as claimed in claim 9 wherein said location determining means include a long range transducer responsive to movement of the object support.

11. Optical measurement apparatus as claimed in claim 1 wherein the means for advancing the object through the measurement station includes a stepper motor, and means are provided for counting the number of steps moved by the motor for determining the advance of the object through the measurement station.

12. Optical measurement apparatus as claimed in claim 1 wherein the means for moving the object through the measuring station includes a motor driven lead screw having encoder means for counting revolutions of the lead screw to determine the advance of the object.

13. Optical measurement apparatus as claimed in claim 1 wherein means are provided for turning the object about an axis transverse to said direction of movement of the object through the measurement station to enable a measurement to be taken across a thread or other convoluted from on the component.

14. Optical Measurement apparatus as claimed in claim 1 wherein the two lens means have mutually obliquely extending optical axes with respect to said array means and means are provided to divide the beam of light from the object illuminated in the measurement station between the two lens means.

15. Optical measurement apparatus as claimed in claim 14 wherein a beam splitter is provided to divide the beam of light between the two lens means.

16. Optical measurement apparatus as claimed in claim 14 wherein one lens means is aligned with the path of the light from the light source to receive light directly therefrom and the other lens means has its optical axis extending obliquely to that path and a mirror is provided at the location where the axis is coincident with the path to reflect light from the light source into the other lens means.

17. Optical measurement apparatus as claimed in claim 1 wherein each lens means has its optical axis extending away from the associated array means and wherein reflector means are provided between each lens means and the array means to provide an extended light path between the lens means and array means to magnify the size of the image of the object.

18. Optical measurement appratus as claimed in claim 17 wherein the reflector means have a common mounting which is adjustable towards and away from the lens means and photo-electric array means to vary said magnification of the image.

19. Optical measurement apparatus as claimed in claim 1 wherein additional reflector means are provided between the lens system and the photo-electric array means which are adjustable to ensure that the two images reflected onto the array means are of the same axial location along the object.

20. Optical measurement apparatus as claimed in claim 19 wherein means are provided for pivotally mounting said additional reflector means for adjustment of the path of the light to be reflected on to the photo-electric array means.

* * * * *

UNITED STATES PATENT AND TRADEMARK OFFICE
CERTIFICATE OF CORRECTION

PATENT NO. : 4,753,532
DATED : June 28, 1988
INVENTOR(S) : Philip James Eric Aldred It is certified that error appears in the above-identified patent and that said Letters Patent is hereby corrected as shown below:

```
Col. 2, line 21, change "engaing" to --engaging--;
Col. 4, line 41, after "of" insert --steps moved by the stepper
      motor which controls axial--;
Col. 7, line 21, after "splitter" insert --5--;
Claim 1, Col. 7, line 33, change "part" to --path--.
```

Signed and Sealed this

Thirteenth Day of December, 1988

Attest:

DONALD J. QUIGG

*Attesting Officer*  *Commissioner of Patents and Trademarks*